United States Patent

[11] 3,604,217

[72] Inventor John C. Spear
  San Francisco, Calif.
[21] Appl. No. 864,749
[22] Filed Oct. 8, 1969
[45] Patented Sept. 14, 1971
[73] Assignee Mobile Products Services, Inc.

[54] PORTABLE REFRIGERATOR FOR VACUUM AND WATER COOLING
  5 Claims, 5 Drawing Figs.
[52] U.S. Cl. .................................................. 62/268,
  62/100, 62/239
[51] Int. Cl. ............................................. F25b 19/00
[50] Field of Search .......................................... 62/100,
  169, 170, 268, 269, 270

[56] References Cited
  UNITED STATES PATENTS
2,722,112  11/1955  Anderson ..................... 62/169
2,996,898  8/1961  Hospen ........................ 62/268
3,009,334  11/1961  Baker .......................... 62/268
3,091,098  5/1963  Bowers ........................ 62/268
3,110,163  11/1963  Webb .......................... 62/270

Primary Examiner—William J. Wye
Attorney—Lothrop & West

ABSTRACT: A refrigerator is mounted on a vehicle and is used for water cooling or for vacuum cooling alternatively. A pressure-resistant enclosure contains refrigerator coils. A pump drawing from auxiliary equipment circulates refrigerant through the refrigerator coils. Air under subatmospheric pressure or water is admitted to the top of the enclosure and is evenly distributed to flow down over the coils. The air is pumped out of the enclosure and the water is drained from the floor of the enclosure. Auxiliary equipment recirculates the drained, cooled water over produce or evacuates the enclosure and any connected chamber.

PATENTED SEP 14 1971 3,604,217

INVENTOR,
JOHN C. SPEAR
BY Lothrop & West
ATTORNEYS

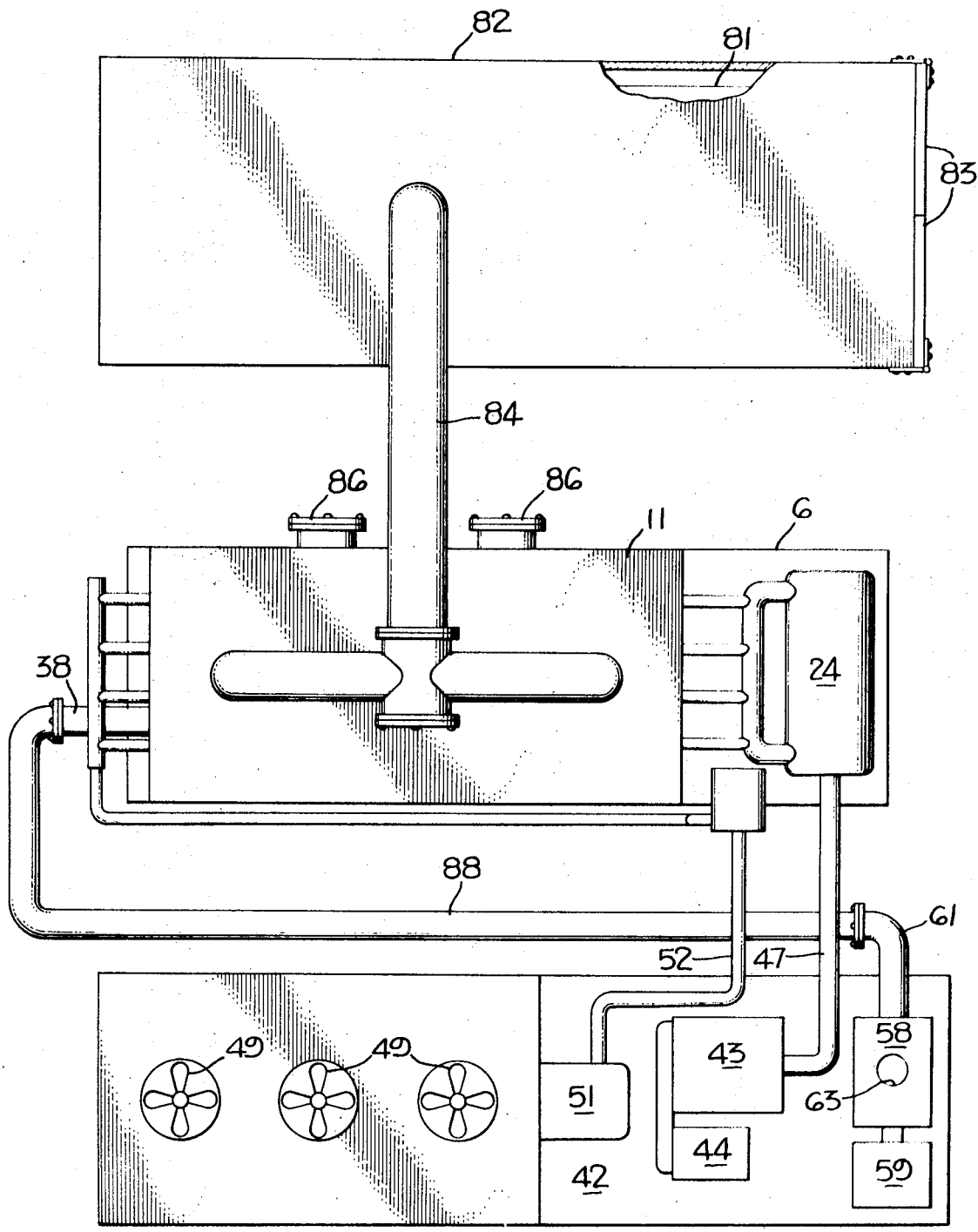

PORTABLE REFRIGERATOR FOR VACUUM AND WATER COOLING

In recent years it has become increasingly popular to handle fruits, vegetables and comparable produce as nearly as possible at the growing point in order to make various economic savings. This has led to the transfer from central packing houses and the like to the fields of many of the operations previously carried on in a central location. The new technique has demonstrated that the produce arrives at market in a premium condition and is more easily and better handled if it is cooled promptly after picking. This indicates the advisability of providing a cooling or refrigeration mechanism which can be made available in the growing field or very close thereto so that harvested produce can be processed virtually on the site and promptly after harvesting.

Some produce is cooled by means of evaporation of the contained water. This is particularly true of lettuce and the like in connection with which vacuum cooling has been utilized for many years. Other produce, for example, celery or peaches, is preferably cooled by being drenched with cold water. Either of these methods of cooling; that is, vacuum cooling by evaporation of local water or cold water cooling, promptly takes the field heat from the produce and is commercially effective.

It is therefore an object of the invention to provide a portable refrigerator which can be utilized in or near a harvesting field and which can likewise be utilized for either vacuum cooling if the related kind of produce is being harvested or for cold water cooling if the related sort of produce is being harvested.

Another object of the invention is to provide portable equipment having substantial refrigeration capacity so that the equipment can be moved from place to place as the season varies in order to take care of peak loads of produce.

Another object of the invention is to provide a portable refrigerator which can be operated under virtually any conditions and usually without the necessity of any special equipment, although another object is to provide a portable refrigerator which can be utilized with permanent or semipermanent installations already available.

Another object of the invention is to provide a portable refrigerator which will meet various highway restrictions so that the equipment can be transferred from point to point on the public roads.

A further object of the invention is to provide a portable refrigerator of improved characteristics. Other objects together with the foregoing are attained in the embodiment of the invention described in the accompanying description and illustrated in the accompanying drawings, in which.

Figure 4:
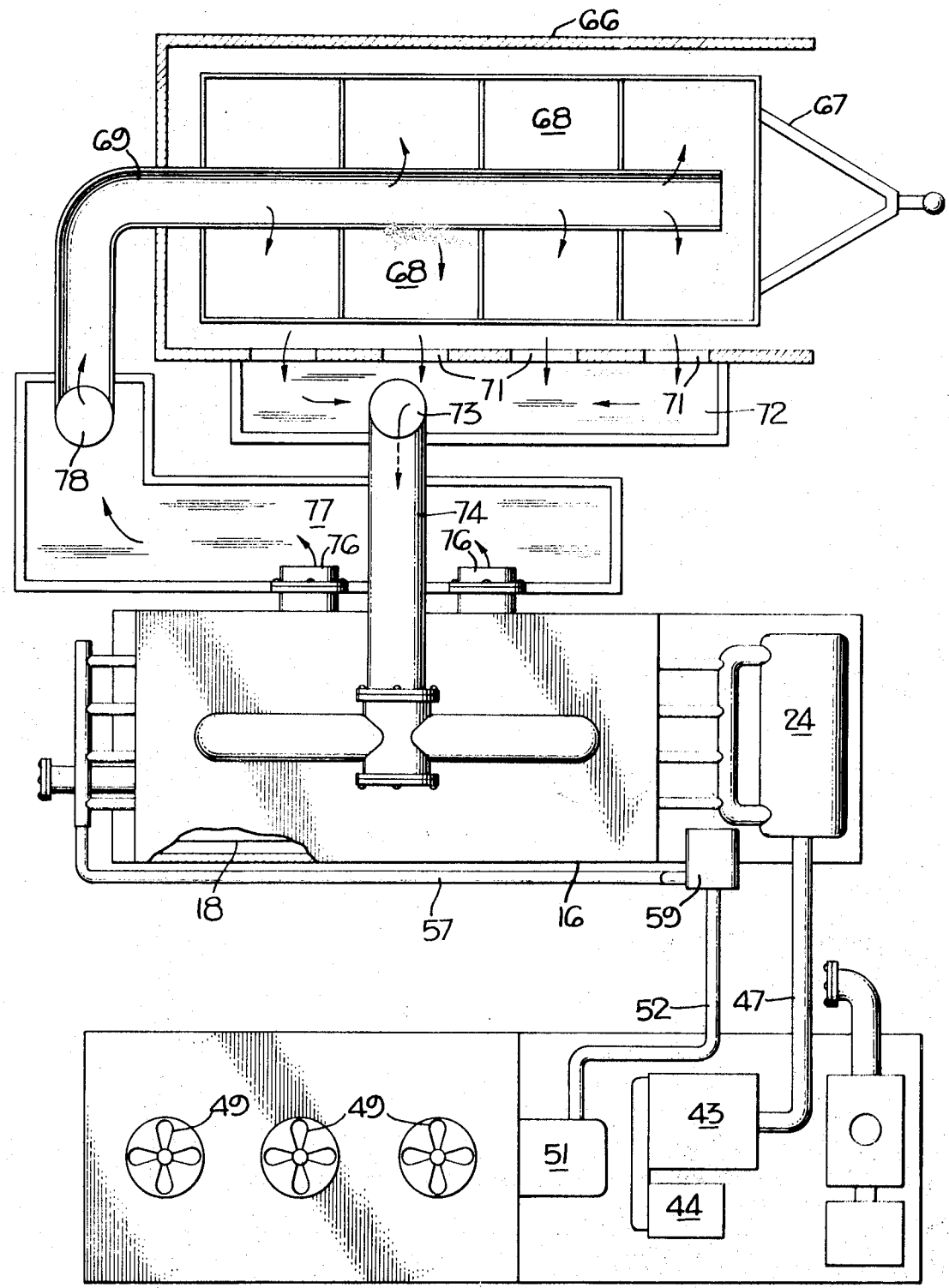

FIG. 4 is for the most part a diagrammatic plan with other parts in cross section on a horizontal plane showing an installation in which the portable refrigerator is utilized for water cooling; and FIG. 5 is a diagrammatic plan like FIG. 4 but rather showing the portable refrigerator set up for use in connection with vacuum cooling. The portable refrigerator pursuant to the invention can be incorporated in a large number of different ways and can be especially adapted in many respects to a particular locality or a particular service, but for general service it has been successfully arranged as it is disclosed herein. The examples herein of vacuum cooling and water cooling are intended only for explanation since the portable refrigerator can be utilized in other heat transfer environments as well.

Figure 1:
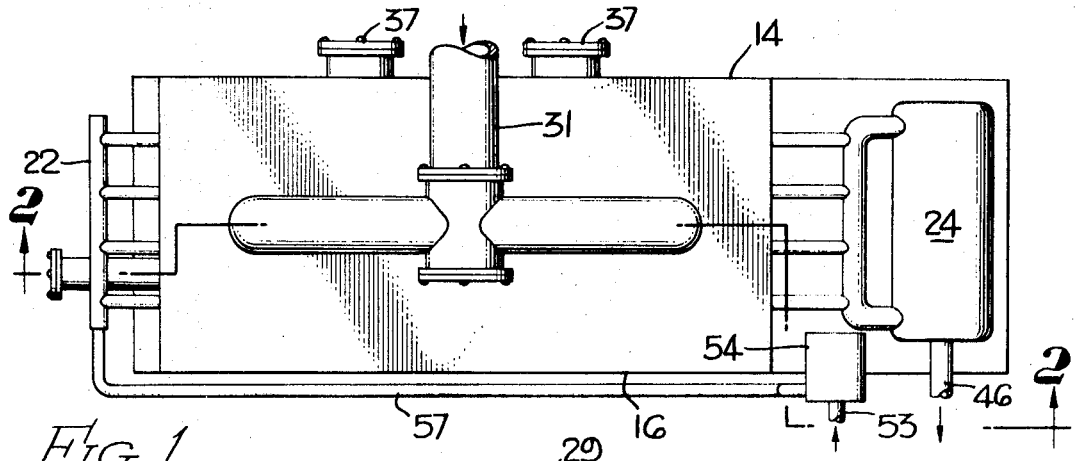
FIG. 1 is a plan of a portable refrigerator constructed pursuant to the invention.
Figure 2:
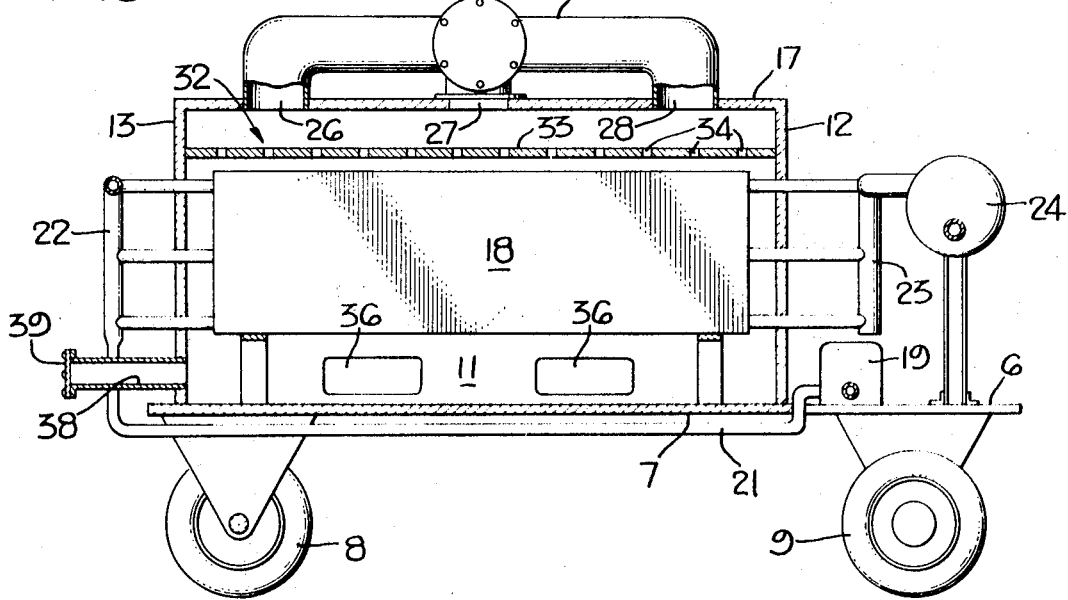
FIG. 2 is a cross section on a vertical longitudinal plane, the plane of section being indicated by the lines 2—2 of FIG. 1.

In a typical example the portable refrigerator, as shown particularly in FIGS. 1 and 2, includes a truck or trailer 6 or any other suitable vehicle having a platform 7 supported on ground-engaging wheels 8 and 9. Erected on the platform 7 and merging therewith to form an airtight enclosure 11 are front and rear walls 12 and 13, sidewalls 14 and 16 and a top wall 17 or roof. Preferably, these walls are quite sturdy and conveniently have reinforcements so that they can withstand a substantial differential pressure since, under some conditions of use, the interior of the enclosure is evacuated to a substantial extent.

The enclosure serves as a housing for a heat exchange unit 18 in the nature of a bank of horizontal heat transfer coils of the usual kind extending for substantially the entire length of the compartment and for most of its width. The coils are supplied with a refrigerant by means of a pump 19 situated on the platform 7 and connected by a duct 21 to a distribution manifold 22 carrying the refrigerant to the coils. As the refrigerant passes through the coils it absorbs heat in the customary fashion and discharges into a manifold 23 connected to an accumulator 24, likewise supported on the platform 7. This construction is substantially for the usual heat transfer or heat absorbing cycle.

The roof 17 is provided with a number of openings 26, 27 and 28, all connected by a manifold 29 to an inlet duct 31. The duct 31 and the manifold 29 are both constructed so as to withstand atmospheric pressure when the interior is evacuated. Also, the manifold and the duct are capable of carrying a flow of water.

So that the fluid flowing into the compartment from the manifold will be uniformly distributed over the coils 18, there is provided in the upper portion of the enclosure a horizontally extending, planar plate 33, conveniently of metal, having a large number of perforations 34 therein. Fluid, particularly liquid, entering the compartment through the manifold flows by gravity through the openings 34 and thus is well distributed over the tube bank 18. Liquid draining from the tube bank onto the floor 7 is released from the compartment through outlet doors 36 substantially at floor level. Since sometimes the unit is not used with outflowing water but must be operated below atmospheric pressure, closure plates 37 are provided for the doors 36. For use when the unit is operated at a subatmospheric pressure, the compartment is likewise in communication with a vacuum duct 38 having a removable closure plate 39. The duct 38 can be opened for withdrawal of air or vapor from the compartment, but when not so used is closed by the plate 39.

Figure 3:
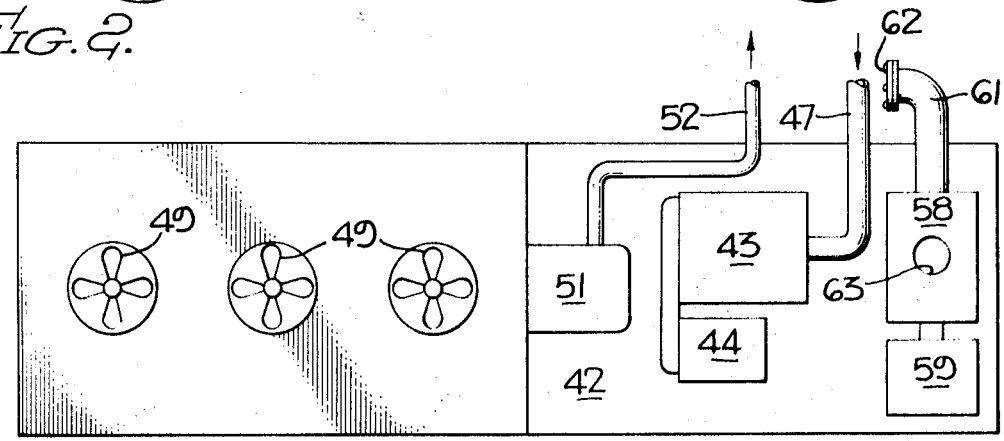
FIG. 3 is a plan of an auxiliary vehicle utilized in connection with the portable refrigerator.

As particularly shown in FIG. 3, there is provided either on the same vehicle or preferably on a separate vehicle a refrigeration unit 41. This vehicle conveniently is a trailer or truck having a platform 42 on which is mounted a compressor 43 driven by a motor 44. Gas from the accumulator 24 is discharged therefrom through a duct 46 having a connection, not shown, to a similar duct 47 extending to the compressor 43. When the vehicles are side by side the ducts 46 and 47 are nearly in alignment and can be coupled directly or through a short, flexible tube (not shown).

The compressor 43 supplies the returned refrigerant to an evaporation condenser 48 disposed on the platform 42 and cooled by power-driven fans 49. Liquid refrigerant from the condenser flows into an accumulator 51 on the platform 42 and is withdrawn through a pipe 52 having a connection, not shown, to a pipe 53 extending to the inlet of a pump 54 on the floor 7. If desired, the pipes 52 and 53 need not be directly connected. Rather the pipe 52 can discharge into the accumulator 24 through a float valve (not shown) responsive to liquid level in the accumulator 24 and the line 53 can be connected to the bottom of the accumulator 24. The pump 54 discharges through a pipe 57 to the manifold 22 and the cycle is completed.

Also mounted on the platform 42 is a vacuum pump 58 driven by a motor 59 and having an inlet duct 61 sometimes closed by a plate 62 and having an outlet 63 to the atmosphere.

The arrangement is shown in FIG. 4 for the cooling of produce, such as peaches, by chilled water. A shed 66 receives a vehicle 67 having a number of bins 68 of peaches thereon. Extending over the loaded bins is a trough 69 having openings therein permitting cold water in the trough to discharge over the lading on the vehicle 67. Field heat from the lading is absorbed by the somewhat warmed water which discharges through openings 71 in the building near the floor thereof.

The discharged water flows into a flume 72 from which it is extracted by a suction pump 73 discharging into a duct 74 substantially identical with the duct 31, as shown in FIG. 1, except for the pump connection. The water discharged from the pump 73 then flows into the manifold 29 and travels through the openings 26, 27 and 28 and is distributed evenly by the perforated plate 32. The water then travels over the coil bank 18. When it has sufficient heat removed therefrom and is again chilled, the water then discharges from the compartment 11 through the openings 36.

In some cases the doors 36 may be provided with discharge nozzles 76 allowing the cooled water to flow by gravity into a flume 77 provided in a convenient location and leading from the nozzles 76 to a suction pump 78. Chilled water extracted from the flume 77 by the pump 78 is introduced into the trough 69 and discharges therefrom by gravity as previously described, thus completing the cooling cycle for the water. The heat exchange unit 18 is itself refrigerated by the unit 41 as described above and as shown in FIG. 3. By this arrangement therefore, portable cooling and refrigeration units can readily be connected to a cooling shed 66 of an available nature so that produce just taken from the field and temporarily in the shed can have the field heat promptly removed therefrom.

Another use of the portable refrigerator is as shown in FIG. 5 in which the problem is to cool produce by vacuum. In this case the produce is, for example, lettuce contained on a vehicle 81 positioned within a vacuum cooling chamber 82 of a well-known sort. The chamber is generally closed but has entrance and exit doors 83. When the chamber is at atmospheric pressure the doors 83 can be opened and the vehicle 81 can be introduced therein following which the doors 83 are closed.

In this instance the vehicle 6 is positioned alongside the vacuum chamber 82 and a pipe 84 is joined to the top of the vacuum chamber and joins or substitutes for the duct 31 connecting to the interior of the enclosure 11. By this means the interior of the chamber 82 and the interior of the compartment or enclosure 11 are in free communication. For this use the door openings 36 in the vehicle 6 are blocked by the plates 37 so that they are airtight and the blocking plate 39 (FIG. 2) is removed from the vacuum duct 38. Also, the closure plate 62 is removed from the inlet pipe 61 connected to the vacuum pump 58 on the vehicle 41. A vacuum duct 88 is tightly connected to the pipe 61 and also to the pipe 38.

This having been done, the mechanism is started and the motor 59 operating the vacuum pump 58 is likewise started. The effect of this is that the pump 58 reduces the pressure within both of the compartments 82 and 11. The produce within the compartment is cooled by the evaporation of the contained moisture. The wet atmosphere from the compartment 82 flows through the pipe 84 into the enclosure 11 and the moist air is distributed by the plate 33 and flows evenly down over the cooling coils 18. Thereupon the temperature of the flowing fluid is substantially reduced.

Much of the water vapor that has been carried over is condensed on the coils and is thus removed from further circulation, thus permitting the vacuum pump 58 to withdraw only noncondensed gases and discharge them through the opening 63 to the atmosphere. The function of the coil bank 18 in this condition is to reduce the volume of material which must be handled by the vacuum pump so that the operation becomes economically feasible. Water which does condense on the coil bank falls by gravity to the bottom of the compartment 11 and thus is not withdrawn through the outlet 38 which is some distance above the bottom.

The produce in the chamber 82 having been appropriately cooled, the mechanism is stopped, the doors 83 are opened, the cooled produce is withdrawn, and another load of produce with field heat is introduced. During this interruption in the vacuum operation, water accumulated within the compartment 11 can be removed in any convenient way, for example, by removing one of the plates 86 and permitting the water to discharge by gravity. A separate drain valve (not shown) can alternatively be provided for this purpose.

The portable refrigerator is thus capable of use not only in connection with vacuum cooling of produce but also in connection with chilled water cooling of produce and can readily be moved from time to time and from place to place in order to accommodate whatever cooling needs exist at particular locations.

What is claimed is:

1. A portable refrigerator for vacuum cooling and water cooling comprising a vehicle, means defining an enclosure on said vehicle, heat transfer coils within said enclosure, means for admitting a fluid from outside said enclosure to the top interior portion of said enclosure, means within said enclosure between said admitting means and said coils, means including a first opening for releasing to the atmosphere liquid from said enclosure below said coils, means for blocking said first opening, means including a second opening for releasing gas from said enclosure, means for blocking said second opening, and means on said vehicle for circulating a refrigerant through said coils.

2. A device as in claim 1 including removable means for blocking said liquid-releasing means, and means connected to said gas-releasing means for subjecting said enclosure to a subatmospheric pressure.

3. A device as in claim 1 in which said distributing means is a substantially horizontal perforated plate substantially overlying said coils.

4. A device as in claim 1 in which said liquid releasing means is substantially at the bottom of said enclosure.

5. A device as in claim 1 in which said fluid-admitting means is capable of conducting water substantially at atmospheric pressure and of conducting air substantially below atmospheric pressure.